Dec. 20, 1960     E. J. BLUTH ET AL     2,965,776
SEALED SUBMERSIBLE MOTOR AND PROCESS OF MAKING SAME
Filed Aug. 8, 1957     2 Sheets-Sheet 1
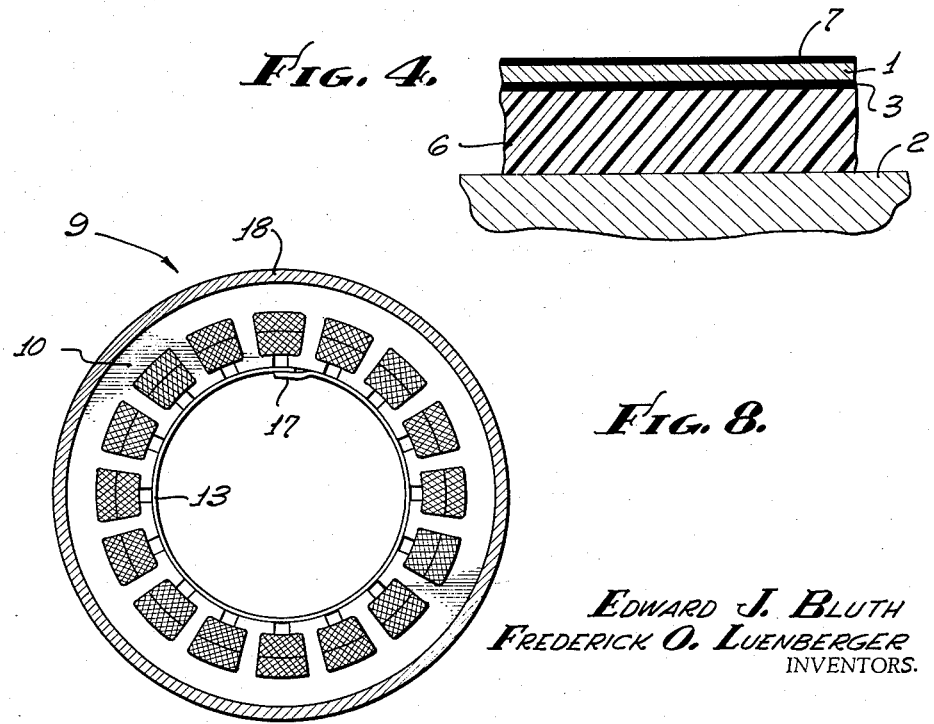
EDWARD J. BLUTH
FREDERICK O. LUENBERGER
INVENTORS.
BY *Flam and Flam*
ATTORNEYS.

Dec. 20, 1960   E. J. BLUTH ET AL   2,965,776
SEALED SUBMERSIBLE MOTOR AND PROCESS OF MAKING SAME
Filed Aug. 8, 1957   2 Sheets-Sheet 2
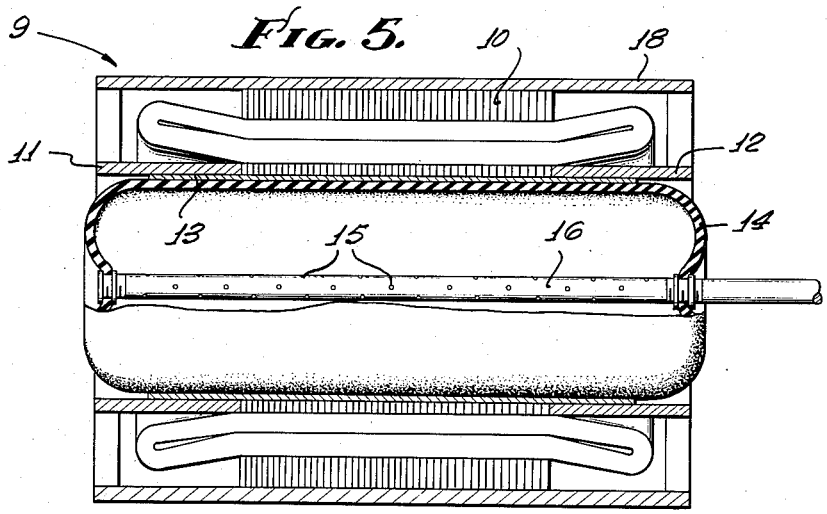
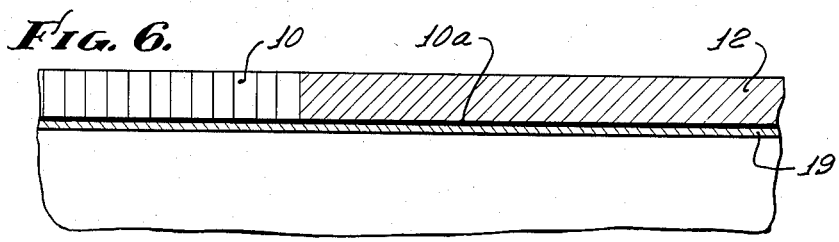
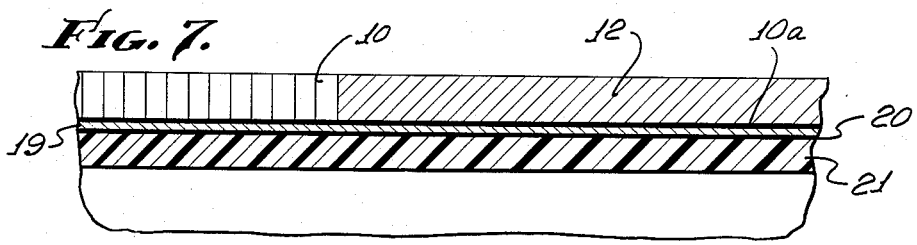
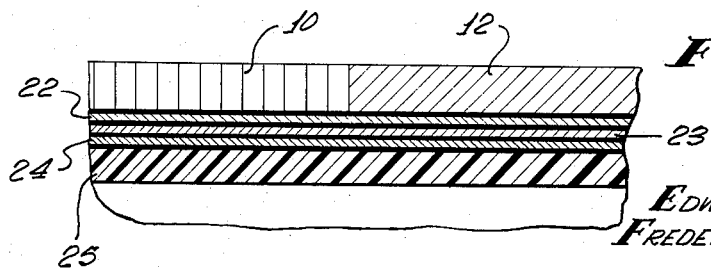
EDWARD J. BLUTH
FREDERICK O. LUENBERGER
INVENTORS.
BY Flam and Flam
ATTORNEYS.

United States Patent Office 2,965,776
Patented Dec. 20, 1960

2,965,776

SEALED SUBMERSIBLE MOTOR AND PROCESS OF MAKING SAME

Edward J. Bluth and Frederick O. Luenberger, Los Angeles, Calif., assignors to U.S. Electrical Motors, Inc., Los Angeles, Calif., a corporation of California Filed Aug. 8, 1957, Ser. No. 677,150

7 Claims. (Cl. 310—86)

This invention relates to the sealing of submersible motors. It has been proposed in the past to provide a sealing tube closely contacting or adhered to the internal periphery of the stator structure. Thus, this tube is located in the air gap between the rotor and the stator.

In a prior application, filed on March 4, 1957, Serial No. 643,624, in the name of Frederick O. Luenberger, and assigned to the same assignee as this application, such a scheme is, in general, disclosed. Thus therein, a tube made of Teflon (polytetrafluoroethylene) serves as the sealing means.

It is one of the objects of this invention to provide a tubular sealing structure that is laminated, at least one of the laminations being made from non-magnetic metal, such as stainless steel. Such a structure has the advantage that a metal layer as thin as two mils (.002 inch) is sufficient to prevent moisture penetration; the additional layer or layers of Teflon serve as a mechanical stiffener, and they may be of about five to ten mils thick.

It is another object of this invention to make it possible to expedite the insertion and adhesion of the laminated tube within the stator. For this purpose, use is made of an adhesive peculiarly adapted to join metal, such as stainless steel, to the metal of the stator bore, as well as to join such metal to the Teflon tube. For example, a synthetic elastomer composition may be used, having thermosetting properties, and including, in addition, thermosetting and thermoplastic resins.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a diagram illustrating a step in the method of preparing a laminated structure from which the sealing tube is made, the thicknesses of the laminations being greatly exaggerated;

Figs. 2 and 3 are views similar to Fig. 1, illustrating additional steps in the process;

Fig. 4 is an enlarged fragmentary sectional view taken along a plane corresponding to line 4—4 of Fig. 3;

Fig. 5 is a diagrammatic longitudinal sectional view illustrating the manner in which pressure may be applied to the interior of the laminated tube for causing it to adhere to the interior surface of the stator bore;

Fig. 6 is a greatly enlarged fragmentary sectional view illustrating the thin stainless steel tube in adhered position with respect to the stator;

Fig. 7 illustrates a further step in the process of installing the laminated tube;

Fig. 8 is a cross-sectional view of a stator showing the sealing tube installed within it; and Fig. 9 is a greatly enlarged sectional view, similar to Fig. 7, but illustrating a modified form of laminated tube.

A thin sheet 1 (Fig. 1) of stainless steel is utilized as one of the laminations of the tube. This stainless steel sheet may be in the order of two mils (.002 inch) in thickness. To prepare this sheet, both sides are etched so as to make it possible to be bonded to other layers of laminations.

A sufficient length of it is placed upon a plate 2 to conform to the periphery of a completed tube with a slight overlap of about one-half an inch. The plate 2 may be heated in any appropriate manner.

On top of the stainless steel strip 1 there is placed a non-fluid adhesive film 3 which is supported on a paper backing 4. This adhesive film 3 may be a compound of synthetic elastomers and resins, some of the resins being thermosetting and some being thermoplastic. Such a composition is found on the market and known as "Scotchweld."

This adhesive film 3 is available on the market as carried by a paper backing 4. It becomes sufficiently soft upon the application of heat, to adhere to the etched surface of sheet 1.

When the three layers 1, 3 and 4 are disposed above the heated plate 2, a roll 5 is passed over the laminated sheet 1, 3, 4 to urge the film 3 into close contact with the stainless steel sheet 1. The attached layers are removed; and upon cooling, the paper backing 4 can be peeled off.

The next step is to join a sheet of Teflon 6 (Fig. 2) to that side of sheet 1 which carries the film 3, by the aid of that film. For this purpose, the Teflon sheet 6 may be of the order of five to ten mils (.005 to .010 inch) in thickness. It is etched on those surfaces which are to be adhered. The sheet 6 is disposed on plate 2, with its etched side uppermost. Then the stainless steel sheet 1 is laid over the Teflon sheet 6 with the adhesive film 3 in contact with the etched upper surface of the Teflon sheet 6. The plate 2 is then appropriately heated.

The roller 5 is used to press the film 3 tightly against the etched upper surface of the Teflon sheet 6 while heat is being applied. Upon sufficient heat being applied, the bonding adhesive 3 serves to join the stainless steel sheet 1 to the Teflon sheet 6.

An adhesive bonding film 7 is then applied to the exposed surface of the stainless steel sheet 1. This step is illustrated in Fig. 3. This step is accomplished in the same way as hereinbefore described, the paper backing 8 for the adhesive film 7 being pulled off after cooling.

Fig. 4 illustrates in greatly exaggerated form the various layers of the laminations from which the sealing tube is made.

Having a sheet formed of laminations 6 and 1 now available, the sheet is rolled into a tubular form and inserted within a stator structure 9 (Fig. 5), the film 7 being exposed on the outer periphery. The tube thus formed is made slightly smaller in diameter than the interior surface of the stator 9. The sheet is long enough to provide an overlap of about one-eighth of an inch; or, if preferred, a butt joint can be provided by accurately determining the developed length of the tube structure. If a lap joint is used, a portion of the exposed Teflon sheet 6 is etched where the overlap occurs, to cause it to bond effectively with the cooperating layer 7, where the sheet 6 overlaps layer 7.

The stator structure includes laminations 10 against which are disposed the end collars 11 and 12. The internal diameters of these collars 11 and 12 conform to the interior periphery of the laminations 10.

The laminated tube designated by reference character 13 is shown in Fig. 5 as disposed within the stator bore. An inflatable or rubber bag 14 is placed into the tube 13. Air under pressure or other form of fluid pressure is applied within the bag 14 as by the aid of the openings 15 within the pipe 16 upon which the bag 14 is supported. The tube is expanded into close contact with the stator 9. At the same time, the entire structure is heated in an oven sufficiently to produce a thermosetting bond between the layer 7 of the laminated sealing tube 13 and the internal bore of the stator 9. The bond formed by adhesive layer 7 is strong and seals against moisture.

The completed stator is shown in Fig. 8. The tube 13 formed as hereinabove described is shown as having an overlap 17.

The stainless steel sheet 1 serves adequately to seal the stator and is reinforced by the Teflon tube 6.

If desired, the stator space sealed by the tubes or sleeves 11 and 12 and the stator frame 18 may be subjected to a test to determine leakage through the laminated tube 13.

In the method just described, the laminations 1 and 6 are first joined together by adhesive film of "Scotchweld" and the composite tube is rolled to fit within the bore of the stator. In Figs. 6 and 7, an alternate form of providing the laminated tube is illustrated.

Thus, first the stainless steel tube 19 (etched on both sides) and with the bonding layer 10a but without the Teflon sheet 6 is installed within the stator laminations 10 and the sleeves or tubes 11 and 12 under heat and pressure. Then an adhesive bonding film 20 (Fig. 7) is pressed onto the interior surface of the stainless steel element 19 by aid of heat and pressure. After the adhesive film 20 is in place, a Teflon sheet 21, with its exterior surface etched, can be formed as a tube and inserted within the adhesive film 20. Heat and pressure again can be applied as heretofore to produce a good bond.

In this instance, the Teflon sheet 21 may form a lap joint. At the end of the overlap, both the inside and outside surfaces of the Teflon sheet 21 are etched so that they may be adhered to the film 20.

Fig. 9 illustrates an alternative form in which there are additional laminations of stainless steel tubes, such as 22, 23 and 24. There is in addition, the stiffening Teflon tube 25. The laminations may all first be formed as laminated sheets as described in connection with Figs. 1 and 4 and then inserted within the bore of the stator. Alternatively, the laminations may be individually applied as described in connection with Figs. 6 and 7.

The inventors claim:

1. The method of providing a tubular liner for sealing a stator structure, which comprises: placing a sheet of metallic liner material on a heated surface; placing a solid film of bonding adhesive that is thermosetting over the metal sheet, the surface of the solid film being in contact with the surface of the metal sheet; said film having a removable backing; rolling the film to create pressure between it and the metal surface; removing the backing; removing the metal sheet with the adhered adhesive from the heated surface; and applying said sheet to the interior surface of the stator, with the adhesive film in contact with said interior surface, in the presence of heat and pressure.

2. The combination as set forth in claim 1, with the additional steps of applying a second solid film of bonding adhesive to the opposite surface of the metal sheet; and applying a polyethylene resin plastic sheet to said second film of adhesive.

3. The method of providing a tubular liner for sealing a stator structure, which comprises: placing a sheet of metallic liner material on a heated surface; placing a solid film of thermosetting bonding adhesive having a backing over the metal sheet, the surface of the solid film being in contact with the surface of the metal sheet; rolling the film to create pressure between it and the metal surface; removing the backing; placing a sheet of polyethylene resin plastic on a heated surface; placing the bonding adhesive side of the metal sheet over the plastic; placing a second solid film of bonding adhesive with its backing to the opposite surface of the metal; rolling the second film onto the said surface; removing the backing from the second film; and applying the adhered sheets of plastic and metal to the interior surface of the stator, with the second adhesive film in contact with the interior surface, in the presence of heat and pressure.

4. The combination as set forth in claim 1, with the additional step of preparing the metal surface by etching it, so that the film of adhesive may adhere to it.

5. The combination as set forth in claim 3, with the additional step of etching those surfaces of the metal sheet and of the plastic sheet, which are to be adhered.

6. In a stator structure for a submersible dynamo-electric machine: a stator core structure of magnetic material, and defining an interior surface; a casing for the exterior surface; a stator winding carried by the core structure; end sleeves respectively extending from the opposite ends of the core structure, and having interior surfaces forming a continuation of the interior surface of the core structure; a nonmagnetic thin tube of stainless steel extending within the sleeves as well as within the core structure; a bonding layer of thermosetting plastic between the tube, and the sleeves and the core structure; and a supplemental reinforcing plastic tube within the steel tube and adhered thereto.

7. The combination as set forth in claim 6, in which there are more than one tube of stainless steel separated by reinforcing plastic tubes bonded to the adjacent steel tubes.

References Cited in the file of this patent

UNITED STATES PATENTS

| | | |
|---|---|---|
| 1,861,036 | Thordarson | May 31, 1932 |
| 2,101,182 | Kittredge | Dec. 7, 1937 |
| 2,258,064 | Myers | Oct. 7, 1941 |
| 2,318,095 | Putman | Mey 4, 1943 |
| 2,340,452 | Child et al. | Feb. 1, 1944 |
| 2,519,588 | McCulloch | Aug. 22, 1950 |
| 2,573,126 | Andrus | Oct. 30, 1951 |
| 2,654,848 | Schaefer | Oct. 6, 1953 |
| 2,721,280 | Dills | Oct. 18, 1955 |
| 2,745,778 | Garten | May 15, 1956 |
| 2,809,310 | Dunn | Oct. 8, 1957 |